United States Patent
Chastek et al.

(10) Patent No.: US 12,441,044 B2
(45) Date of Patent: Oct. 14, 2025

(54) APPARATUS FOR DISPENSING A COMPOSITION

(71) Applicant: 3M INNOVATIVE PROPERTIES COMPANY, St. Paul, MN (US)

(72) Inventors: Thomas Q. Chastek, St. Paul, MN (US); Garth V. Antila, Hudson, WI (US); Ilya A. Salnikov, Inver Grove Heights, MN (US); Richard P. Lovelien, Baldwin, WI (US); Gibson L. Batch, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 201 days.

(21) Appl. No.: 17/908,402

(22) PCT Filed: Mar. 12, 2021

(86) PCT No.: PCT/IB2021/052094
§ 371 (c)(1),
(2) Date: Aug. 31, 2022

(87) PCT Pub. No.: WO2021/191718
PCT Pub. Date: Sep. 30, 2021

(65) Prior Publication Data
US 2023/0091065 A1 Mar. 23, 2023

Related U.S. Application Data

(60) Provisional application No. 62/994,633, filed on Mar. 25, 2020.

(51) Int. Cl.
*B29C 48/51* (2019.01)
*B29C 48/25* (2019.01)
*B29C 48/395* (2019.01)

(52) U.S. Cl.
CPC ............ *B29C 48/51* (2019.02); *B29C 48/252* (2019.02); *B29C 48/397* (2019.02)

(58) Field of Classification Search
CPC ..... B29C 48/397; B29C 48/51; B29C 48/252; B29C 48/515
See application file for complete search history.

(56) References Cited

U.S. PATENT DOCUMENTS

| | | | | |
|---|---|---|---|---|
| 2,680,880 A | * | 6/1954 | Corbett | ................... B29C 48/37 |
| | | | | 425/197 |
| 3,689,182 A | * | 9/1972 | Kovacs | ................. B29C 48/515 |
| | | | | 425/208 |

(Continued)

FOREIGN PATENT DOCUMENTS

| | | | | |
|---|---|---|---|---|
| CN | 202388778 | | 8/2012 | |
| CN | 202388778 U | * | 8/2012 | ......... B29C 47/6043 |

(Continued)

OTHER PUBLICATIONS

English translation of CN-202388778-U by EPO. (Year: 2012).*
(Continued)

*Primary Examiner* — Xiao S Zhao
*Assistant Examiner* — Inja Song
(74) *Attorney, Agent, or Firm* — Vincent Pham (57) ABSTRACT

Provided are an apparatus and methods for dispensing a composition, the apparatus includes a barrel (120) having an inlet (128) and an outlet (129), a screw (122) received in the barrel, and a drive mechanism operatively coupled to a shank end (134) of the screw to rotate the screw. The screw is hollow and includes both interior and exterior surfaces, the interior surfaces defining a cavity (142) adjacent to the outlet, and wherein the screw further includes a plurality of apertures (140) through which the cavity and exterior surfaces communicate with each other. The apertures are located along a perforated portion (146) of the cavity, where (Continued)

the perforated portion can have a transverse dimension that increases with distance from the shank end. The apertures can also provide a hole area, relative to the exterior surface of the screw, that increases with distance from the shank end. The screw can also include a helical flight (132) having a raised flight section (150) and one or more lowered flight sections (152), where the apertures are at least partially located on the lowered flight section.

16 Claims, 5 Drawing Sheets

(56) References Cited

U.S. PATENT DOCUMENTS

| | | | | |
|---|---|---|---|---|
| 3,756,574 | A | * | 9/1973 | Maddock ............... B29C 48/51 366/82 |
| 4,802,140 | A | * | 1/1989 | Dowling ................ B29C 48/51 366/144 |
| 2007/0104021 | A1 | * | 5/2007 | Okabe ..................... B29C 45/60 366/89 |
| 2017/0291364 | A1 | | 10/2017 | Womer |
| 2018/0354181 | A1 | | 12/2018 | Kazmer |

FOREIGN PATENT DOCUMENTS

| | | |
|---|---|---|
| WO | 2020003123 | 1/2020 |
| WO | 2020025446 | 2/2020 |
| WO | 2020174394 | 9/2020 |
| WO | 2020174396 | 9/2020 |
| WO | 2021033084 | 2/2021 |

OTHER PUBLICATIONS

Design a Small Extrusion Head for 3D Printer Using Plastics Granulates, Jun. 2016, Vives University, [retrieved from the internet on Oct. 17, 2022], URL <https://uvadoc.uva.es/bitstream/10324/19624/1/TFG-I-527.pdf>, 92 pages.

International Search Report for PCT International Application No. PCT/IB2021/052094, mailed on Aug. 23, 2021, 4 pages.

Pellet extruder for composite thermoplastic 3D printing, A CEAD solution, [retrieved from the internet on Oct. 17, 2022], URL <https://robotextruder.com/#about>, 12 pages.

Pellet Extruder V3. Sep. 2019, [retrieved from the internet on Oct. 17, 2022], URL <https://mahorxyz.wordpress.com/2016/05/02/pellet-extruder/>, 21 pages.

Pellet Extruder, an open-source Pellet Extruder for large format 3D Printing, [online], [retrieved from the internet on Oct. 17, 2022], URL <https://hackaday.io/project/100099-pellet-extruder>, 9 pages.

\* cited by examiner

APPARATUS FOR DISPENSING A COMPOSITION

CROSS REFERENCE TO RELATED APPLICATIONS

This application is a national stage filing under 35 U.S.C. 371 of PCT/IB2021/052094, filed Mar. 12, 2021, which claims the benefit of U.S. Provisional Patent Application No. 62/994,633, filed Mar. 25, 2020, the disclosure of which is incorporated by reference in its/their entirety herein.

FIELD OF THE INVENTION

Provided are dispensers for polymeric compositions, and particularly those capable of continuously dispensing polymeric compositions, along with related methods and dispensing systems.

BACKGROUND

Screw dispensers are commonly used as feeding mechanisms for polymeric materials in a continuous manufacturing or converting operation. These machines use a rotating screw housed within a cylindrical barrel. The barrel includes an inlet, typically located on the top of the barrel and an outlet located at the end of the barrel. Along its length, the barrel can include one or more resistive heating elements, which can be precisely controlled.

These dispensers typically receive and convert a feed stock containing one or more polymers. The feed stock can include one or more thermoplastic resins that are solid at ambient temperature. After being fed into the dispenser through the inlet, the feed stock is heated above its melt temperature through a combination of thermal conduction along the walls of the barrel and the high pressure and friction generated by the screw rotation. The feed stock is thus metered, melted, and mixed as it is conveyed along the length of the barrel by the rotating screw and is eventually expelled from the distal end of the barrel through the outlet.

The screw can be operated at a predetermined speed using an electric motor drive unit and gearbox. Temperature controllers are connected to heating and/or cooling elements at one or more zones along the barrel to maintain set-point temperatures. The capability of the screw and barrel assembly to extrude a given material is based on the characteristics or construction of the barrel and screw, the characteristics of the composition being dispensed, and the circumstances under which the system is operated.

SUMMARY

Numerous design considerations and tradeoffs are considered in configuring a single-screw dispenser, especially for applications that require precise metering of a significant volume of material. Moving large quantities of materials typically requires expanding the size of the screw and barrel or increasing the rotational speed of the screw. Scaling up the size of the machine can substantially increase weight and cost. Faster screw speed generally increases torque levels and can require a larger driver motor, which can also increase weight and cost.

Another problem relates to thermal transfer. For a solid thermoplastic to be effectively dispensed, its temperature must be raised above its melt temperature. Heat can be imparted through the barrel, but the rate of heat transfer can be limited by the residence time of the thermoplastic within the dispenser. In these cases, the length of the dispenser is often increased to provide time to fully melt the thermoplastic. Further, a dispenser must contend with a heterogeneous mixture of solids of various sizes churning within a liquid melt, presenting the problem of how to efficiently deliver heat to the solids without overheating the melt.

Provided herein is an automated dispensing solution that uses a hollow core screw that provides an unconventional flow path that progressively separates the solid and liquid parts of the composition in a manner that alleviates many of these technical challenges. Surprisingly, the provided screw can provide a similar or greater degree of throughput as a conventional single-screw dispenser but with significantly reduced shear and significantly reduced torque. The reduced torque derives from the increased amount of air in the exterior-facing channels of the screw and allows for a smaller and lighter driver motor. A reduction in weight can, in turn, allow the dispenser to be mounted on a smaller and more cost-effective robotic arm in an automated manufacturing process.

The operation of the provided dispenser also provides sustainability benefits. The increased surface area and flow pathways of the hollow core screw can improve heat transfer and can provide improved melting at lower extruder temperatures for lower power consumption. Faster melting may allow higher throughput without need for a longer screw/barrel. Reducing shear on the composition can also reduce thermal degradation, improving quality while reducing waste.

It was found that the provided apparatus can be especially suited for point-of-use dispensing of pressure-sensitive adhesives, as previously described in U.S. Provisional Patent Application No. 62/810,221 (Napierala, et al.), 62/810,248 (Napierala, et al.), and 62/907,325 (Napierala, et al.).

In a first aspect, an apparatus for dispensing a composition is provided. The apparatus comprises: a barrel having an inlet and an outlet; a screw received in the barrel, the screw having a distal end and a shank end; and a drive mechanism operatively coupled to the shank end and capable of rotating the screw within the barrel. The screw is hollow and includes both interior and exterior surfaces, the interior surfaces defining a cavity adjacent to the outlet, and wherein the screw further includes a plurality of apertures through which the cavity and exterior surfaces communicate with each other. The plurality of apertures are located along a perforated portion of the cavity, and the perforated portion can have a transverse dimension that increases with distance from the shank end.

In a second aspect, an apparatus for dispensing a composition is provided, the apparatus comprising: a barrel having an inlet and an outlet; a screw received in the barrel, the screw having a distal end and a shank end; and a drive mechanism operatively coupled to the shank end and capable of rotating the screw within the barrel. The screw is hollow and includes both interior and exterior surfaces, the interior surfaces defining a cavity adjacent to the outlet, and wherein the screw further includes a plurality of apertures through which the cavity and exterior surfaces communicate with each other. The screw comprises a helical flight extending around a shaft, and the helical flight can include a raised flight section and one or more lowered flight sections adjacent to the raised flight section, the raised flight section and the lowered flight section extending parallel to each other along the helical flight. The lowered flight section can be located distal to the raised flight section and adjacent to an exposed surface of the shaft, wherein the plurality of apertures are at least partially located on the one or more lowered flight sections.

In a third aspect, an apparatus for dispensing a composition, the apparatus comprising: a barrel having an inlet and an outlet; a screw received in the barrel, the screw having a distal end and a shank end; and a drive mechanism operatively coupled to the shank end and capable of rotating the screw within the barrel. The screw is hollow and includes both interior and exterior surfaces, the interior surfaces defining a cavity adjacent to the outlet, and wherein the screw further includes a plurality of apertures through which the cavity and exterior surfaces communicate with each other. The plurality of apertures are located along a perforated portion of the cavity, and the perforated portion can have a hole area, relative to the exterior surface of the screw, that increases with distance from the shank end.

In a fourth aspect, a screw having a distal end and a shank end for use with an apparatus for dispensing a composition is provided. The apparatus comprises a barrel having an inlet and an outlet, and a drive mechanism operatively coupled to the shank end and capable of rotating the screw within the barrel. The screw comprises: a shaft; a helical flight extending around the shaft, wherein the shaft is hollow and includes both interior and exterior surfaces, the interior surfaces defining a cavity adjacent to the outlet; and a plurality of apertures through which the cavity and exterior surfaces communicate with each other. The plurality of apertures are located along a perforated portion of the cavity, the perforated portion having a transverse dimension that increases with distance from the shank end.

In a fifth aspect, a screw having a distal end and a shank end for use with an apparatus for dispensing a composition is provided. The apparatus comprises a barrel having an inlet and an outlet, and a drive mechanism operatively coupled to the shank end and capable of rotating the screw within the barrel. The screw comprises: a shaft; a helical flight extending around the shaft, wherein the shaft is hollow and includes both interior and exterior surfaces, the interior surfaces defining a cavity adjacent to the outlet; and a plurality of apertures through which the cavity and exterior surfaces communicate with each other. The helical flight includes a raised flight section and one or more lowered flight sections adjacent to the raised flight section, the raised flight section and the lowered flight section extending parallel to each other along the helical flight. The lowered flight section can be located distal to the raised flight section and adjacent to an exposed surface of the shaft, wherein the plurality of apertures are at least partially located on the one or more lowered flight sections.

In a sixth aspect, a screw having a distal end and a shank end for use with an apparatus for dispensing a composition is provided. The apparatus comprises a barrel having an inlet and an outlet, and a drive mechanism operatively coupled to the shank end and capable of rotating the screw within the barrel. The screw comprises: a shaft; a helical flight extending around the shaft, wherein the shaft is hollow and includes both interior and exterior surfaces, the interior surfaces defining a cavity adjacent to the outlet, and a plurality of apertures through which the cavity and exterior surfaces communicate with each other. The plurality of apertures are located along a perforated portion of the cavity, and the perforated portion can have a hole area, relative to the exterior surface of the screw, that increases with distance from the shank end.

In a seventh aspect, a method of dispensing a composition using the apparatus is provided. The method comprises: feeding the composition into the inlet of the barrel; rotating the screw to convey the composition toward the distal end of the screw, and generating sufficient pressure to urge the composition through the plurality of apertures and into the cavity; and expelling the composition from the cavity through the outlet of the barrel.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

"Ambient temperature" means at a temperature of 22 degrees Celsius.

"Non-tacky" refers to a material that passes a "Self-Adhesion Test", in which the force required to peel the material apart from itself is at or less than a predetermined maximum threshold amount, without fracturing the material. The Self-Adhesion Test is described in International Patent Publication No. WO 2019/164678 (Nyaribo, et al.) and is typically performed on a sample of the sheath material to determine whether or not the sheath is non-tacky.

"Pressure-sensitive adhesives" refers to materials that are normally tacky at room temperature and can be adhered to a surface by application of light finger pressure and thus may be distinguished from other types of adhesives that are not pressure-sensitive. A general description of pressure-sensitive adhesives may be found in the Encyclopedia of Polymer Science and Engineering, Vol. 13, Wiley-Interscience Publishers (New York, 1988). Additional description of pressure-sensitive adhesives may be found in the Encyclopedia of Polymer Science and Technology, Vol. 1, Interscience Publishers (New York, 1964). "Pressure sensitive adhesive" or "PSA", as used herein, refers to a viscoelastic material that possesses the following properties: (1) aggressive and permanent tack, (2) adherence to a substrate other than a fluorothermoplastic film with no more than finger pressure, and (3) sufficient cohesive strength to cleanly release from the substrate. A pressure-sensitive adhesive may also meet the Dahlquist criterion described in Handbook of Pressure- Sensitive Adhesive Technology, D. Satas, 2nd ed., page 172 (1989). This criterion defines a pressure-sensitive adhesive as one having a one-second creep compliance of greater than $1\times10^{-6}$ cm2/dyne at its use temperature (for example, at temperatures in a range of from 15° C. to 35° C.).

"Screw length" refers to the length of the flighted portion of an extrusion screw (the portion that normally comes into contact with the extrudate) but does not include the shank.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises", and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described relating to the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

A dispensing apparatus, along with systems and methods thereof, are described herein for the continuous dispensing of a polymeric feed stock in molten form. The dispensed compositions are optionally pressure-sensitive adhesives. The dispensing apparatus can be made very compact and operate in an environment where there is essentially zero backpressure at the outlet of the dispenser.

Figure 1:
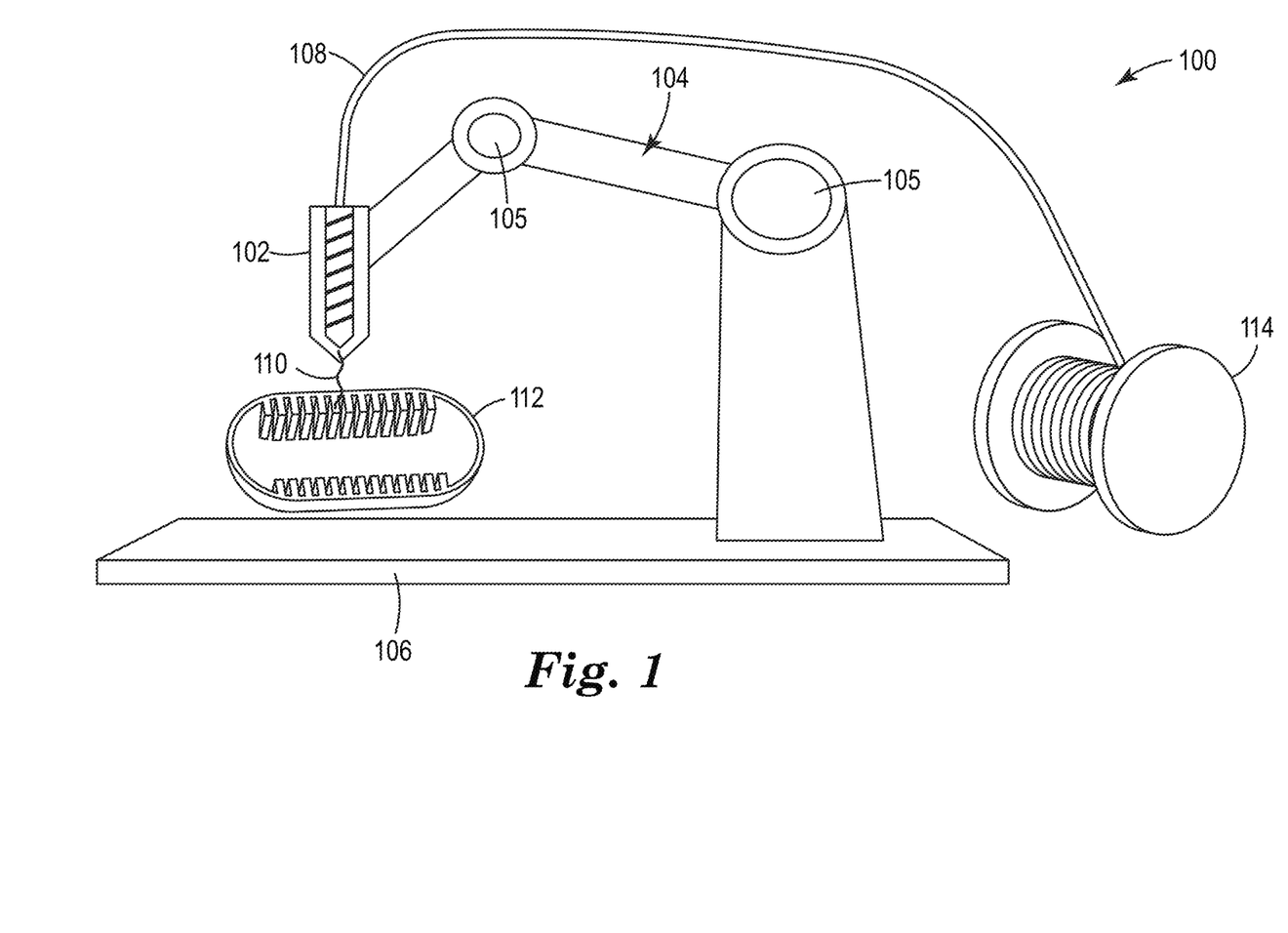
FIG. 1 is a schematic of a dispensing system according to one exemplary embodiment.

FIG. 1 is a schematic illustration of an exemplary dispensing system 100 that includes a dispensing apparatus 102 mounted to the end of a movable arm 104. The movable arm 104 is affixed to a base 106, which can be part of a table or other platform. The movable arm 104 can have any number of joints 105 to allow the dispensing apparatus 102 to be translated and rotated in up to six degrees of freedom. The movable arm 104, which may be manually or robotically controlled, allows the dispensing apparatus 102 to dispense an adhesive composition with precision and reproducibility over a wide range of locations relative to the base 106.

Optionally and as shown, the dispensing system 100 includes a filament adhesive 108 that can be continuously fed into the dispensing apparatus 102 as shown in FIG. 1. The filament adhesive 108 can be continuously unwound from a spool 114 as shown. It is to be understood that the location of the spool 114 relative to other components of the dispensing system 100 is not critical and can mounted where convenient. The spool 114 can be fixtured to the base 106 or a structure to which the base 106 is commonly mounted.

The dispensing apparatus 102 of FIG. 1 is being shown dispensing a molten composition 110 in hot melt form onto the bonding surface of a given substrate 112. The substrate 112 need not be limited and can be, for example, an industrial part to be adhesively coupled to an assembly. As an option, the substrate 112 can be mounted onto the base 106, thereby providing a spatial point of reference for positioning of the dispensing apparatus 102. This can be especially useful in an automatic process, where a computer is used to control the position and orientation of the dispensing apparatus 102.

Advantageously, dispensing of the molten composition 110 can be automated or semi-automated, thus requiring little or no intervention by a human operator. It is possible, for example, to dispense the molten composition 110 onto the substrate 112 according to instructions provided by a computer based on a pre-determined pattern. The pre-determined pattern can be 2-dimensional (along a planar surface) or 3-dimensional (along a non-planar surface). The pre-determined pattern can be represented by digitized model on the computer, enabling the pre-determined pattern to be customized for any number of substrates.

The dispensing system 100 of FIG. 1 is specifically adapted to receive the filament adhesive. Filament adhesives are tacky substances provided in a continuous thread-like configuration. The filament adhesive preferably has a uniform cross-section.

Advantageously, a filament adhesive can be fed continuously from a spool into a dispensing apparatus, such as a dispensing apparatus.

Particularly useful filament adhesives have a core-sheath filament configuration, as described in International Patent Publication No. WO 2019/164678 (Nyaribo, et al.). Core-sheath filament materials have a configuration in which a first material (i.e., the core) is surrounded by a second material (i.e., the sheath). Preferably, the core and the sheath are concentric, sharing a common longitudinal axis.

The ends of the core need not be surrounded by the sheath. Advantageously, the non-tacky sheath prevents the filament adhesive 108 from sticking to itself, thereby enabling convenient storage and handling of the filament adhesive 108 on the spool 114.

The diameter of the core-sheath filament is not particularly restricted. Factors that influence the choice of filament diameter include the size constraints on the adhesive dispenser, desired adhesive throughput, and precision requirements for the adhesive application. The core-sheath filament can comprise an average diameter of 1 millimeter to 20 millimeters, 3 millimeters to 13 millimeters, 6 millimeters to 12 millimeters, or in some embodiments, less than, equal to, or greater than 1 millimeter, 2, 3, 4, 5, 6, 7, 8, 9, 10, 11, 12, 13, 14, 15, 16, 17, 18, 19, or 20 millimeters. The filament adhesive 108 can be a stock item and provided in any length appropriate for the application.

The dispensing methods described herein offer many potential technical advantages, at least some of which are unexpected. These technical advantages include retention of adhesive properties after dispensing, low volatile organic compound (VOC) characteristics, avoiding die cutting, design flexibility, achieving intricate non-planar bonding patterns, printing on thin and/or delicate substrates, and printing on irregular and/or complex topologies.

Core sheath filament adhesives according to the present disclosure can be made using any known method. In an exemplary embodiment, these filament adhesives are made by extruding molten polymers through a coaxial die. Technical details, options and advantages concerning the aforementioned core sheath filament adhesives are described in Nyaribo, et al.

It is to be understood that the provided dispensing apparatus 102 need not be limited to the dispensing system 100 shown in FIG. 1. In other embodiments, the dispensing apparatus 102 can have a fixed location and/or orientation. Further, the dispensing apparatus 102 can accept feed stock other than filament adhesives; for example, the dispensing apparatus 102 can accept polymer pellets, flakes, or granules through a hopper or other feed mechanism known to those skilled in the art.

Figure 2:
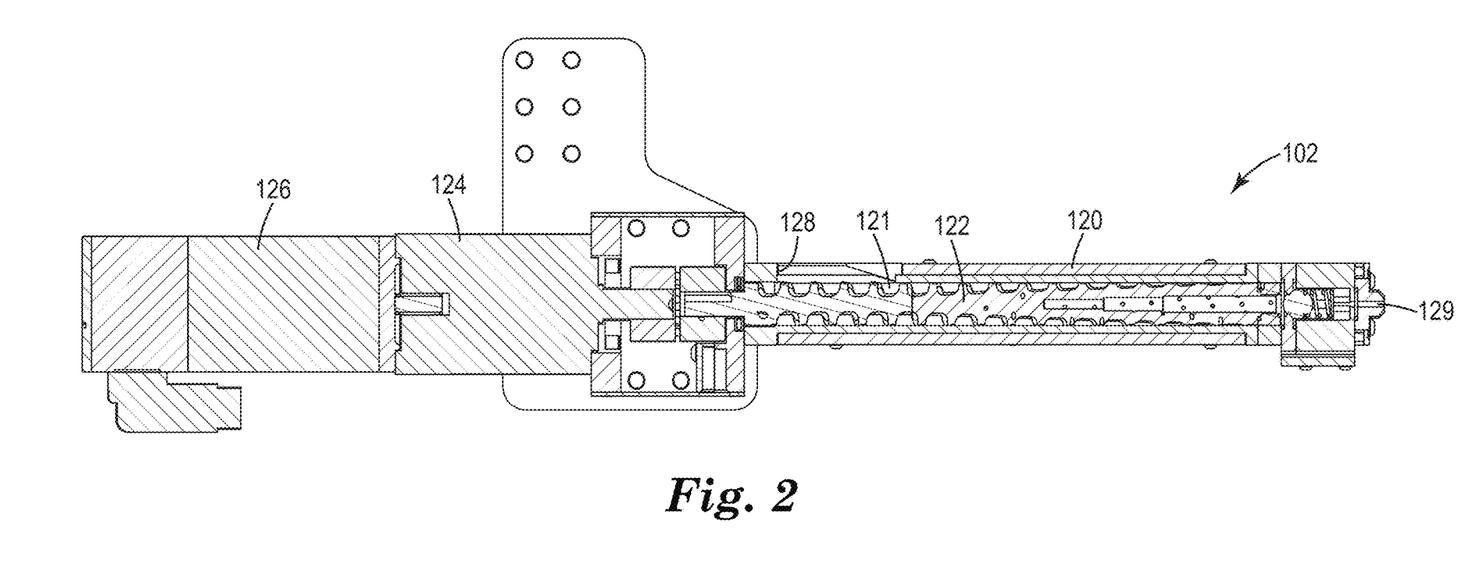
FIG. 2 is a cut-away view of a dispensing apparatus that can be used in the dispensing system of FIG. 1 in an exemplary embodiment.

FIG. 2 shows in greater detail the dispensing apparatus 102 of FIG. 1. As shown, the dispensing apparatus 102 includes a barrel 120 and a rotatable screw 122 received therein. A gearbox 124 and motor 126 provide a drive mechanism operatively coupled to the screw 122. The drive mechanism powers the rotation of the screw 122 within the barrel 120 when the apparatus 102 is being operated. It is advantageous for the motor 126 to have a high torque limit causing it to stall above a set torque level to avoid breakage of the screw 122 if there is a clog during operation.

The barrel 120 contains one or more heating elements to heat the feed stock composition, such as a thermoplastic composition, above its melting temperature. Adjacent to one end of the screw 122 is an inlet 128 where the filament adhesive 108 can enter the apparatus 102 and become melted from thermal contact with the heated barrel 120 and shearing action imparted by the rotation of the screw 122 therein. On the opposite end of the screw 122, the barrel 120 has an outlet 129 aligned with a longitudinal axis 144 (shown in FIG. 4) of the screw 122, where the molten composition is continuously dispensed from the apparatus 102.

For proper operation, it is desirable for the screw 122 to be closely meshed with the inner surfaces of the barrel 120. A small clearance is generally present therebetween to allow free rotation of the screw 122 and facilitate its insertion and removal from the barrel 120. During operation, this clearance accommodates a small amount of molten composition, thereby providing a liquid seal against the barrel 120. Further details concerning the structure and operation of the screw 122 are provided below in reference to FIG. 3.

Figure 3:
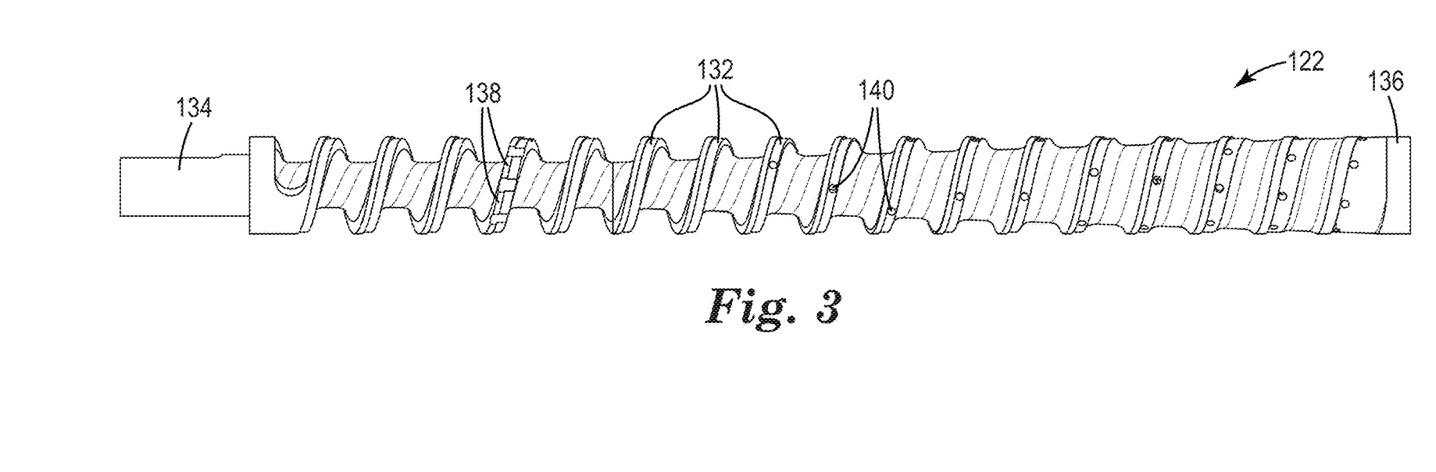
FIG. 3 is an elevational, side view of a screw according to one embodiment used in the dispensing apparatus of FIG. 2.

Referring to FIG. 3, the screw 122 is comprised of a shaft 130 and a single helical flight 132 disposed thereon. Located on one end of the screw 122 is a shank end 134 having a configuration enabling mechanical coupling to the drive mechanism. On the opposite end of the screw 122 is a distal end 136 (the term "distal" hereinafter referring to a direction toward the distal end 136). From the shank end 134 to the distal end 136, the shaft 130 becomes progressively larger in diameter. Where the outer contours of the screw 122 are circumscribed within a cylinder, as here, the height of the flight 132 becomes progressively smaller as the shaft 130 increases in diameter. This has the effect of increasing the amount of shear imparted to the composition as it travels lengthwise along the screw 122.

To support a high overall throughput, it is desirable for the screw 122 to have a relatively large channel depth (or flight depth at the shank end) to accommodate a large influx of feed stock. Deeper channels can provide for lower torque on the rotating screw. The configuration of the screw 122 was found to efficiently dispense compositions with a channel depth of from 15 percent to 35 percent, 20 percent to 30 percent, 25 percent to 30 percent, or in some embodiments, less than, equal to, or greater than 15 percent, 16, 17, 18, 19, 20, 21, 22, 23, 24, 25, 26, 27, 28, 29, 30, 31, 32, 33, 34, or 35 percent of the diameter of the screw 122 adjacent to the inlet 128 of the barrel 120. The overall screw diameter can be from 5 millimeters to 100 millimeters, from 10 millimeters to 50 millimeters, from 15 millimeters to 35 millimeters, or in some embodiments less than, equal to, or greater than 5 millimeters, 10, 15, 20, 25, 30, 35, 40, 45, 50, 60, 70, 80, 90, or 100 millimeters.

The flight 132 can have any suitable flight pitch, representing the distance between consecutive leading edges of the flight 132, measured along the lengthwise direction of the screw 122. The flight pitch can have an average flight pitch of from 40 percent to 80 percent, from 50 percent to 70 percent, from 60 percent to 70 percent, or in some embodiments, less than, equal to, or greater than 40 percent, 42, 45, 47, 50, 52, 55, 57, 60, 62, 65, 67, 70, 72, 75, 77, or 80 percent of the screw diameter. The provided dispersing screw 122 provides greater flow stability than a conventional screw, enabling use of a higher pitch corresponding to a higher throughput.

Advantageously, the efficient operation of the screw 122 enables it to have a length significantly shorter than conventional dispensing screws. The length:diameter (L:D) ratio of the screw 122 can be from 6:1 to 20:1, from 8:1 to 18:1, from 10:1 to 16:1, or in some embodiments, less than, equal to, or greater than 6:1, 7:1, 8:1, 9:1, 10:1, 11:1, 12:1, 13:1, 14:1, 15:1, 16:1, 17:1, 18:1, 19:1, or 20:1. It is notable that an L:D ratio that is too high implies a long screw, which requires a high level of torque to operate. High torque in turn requires a large motor, which consumes more energy and makes lightweighting difficult. If the L:D is too low, then the functionality of the screw to dispense material or feed stock goes down. The rate of melting will be limited, and the throughput would need to be kept low as a result.

Optionally, the screw 122 includes a plurality of gripping lugs 138 near to the shank end 134 of the screw 122. The gripping lugs 138 are formed by disposing notches into the flights of the screw 122 and providing additional edges that assist in catching and actively pulling a continuous filament adhesive through the inlet 128 and into the barrel 120. This is a significant benefit over feeding mechanisms that require adhesive to be pushed into the feed zone, which can induce undesirable buckling and kinking of the filament adhesive.

The gripping lugs 138 can extend across from 1 percent to 30 percent, from 3 percent to 25 percent, from 5 percent to 20 percent, or in some embodiments, less than, equal to, or greater than 1 percent, 2, 3, 4, 5, 6, 7, 8, 9, 10, 11, 12, 13, 14, 15, 16, 17, 18, 19, 20, 22, 25, 27, or 30 percent of the nominal screw length. For applications where particulate feed stock is to be dispensed, the gripping lugs 138 can be omitted.

As further shown in FIG. 3, a plurality of apertures 140, or radial through-holes, are present on the flight 132 of the screw 122. The apertures 140 provide communication between external surfaces and internal surfaces within the screw 122 during operation of the apparatus 102. The apertures 140 may of any size sufficient to enable passage of a molten composition therethrough, with the understanding that the appropriate size would depend on factors such as the viscosity characteristics of the composition, temperature, and pressure. The apertures 140 can have any suitable shape and can be uniform or polydisperse in size.

In exemplary embodiments, the apertures 140 can have an average diameter of from 0.2 millimeters to 5 millimeters, from 0.5 millimeters to 3 millimeters, from 1 millimeters to 2.5 millimeters, or in some embodiments, less than, equal to, or greater than 0.2 millimeters, 0.3, 0.4, 0.5, 0.7, 1, 1.5, 2, 2.5, 3, 3.5, 4, 4.5, or 5 millimeters.

Figure 4:
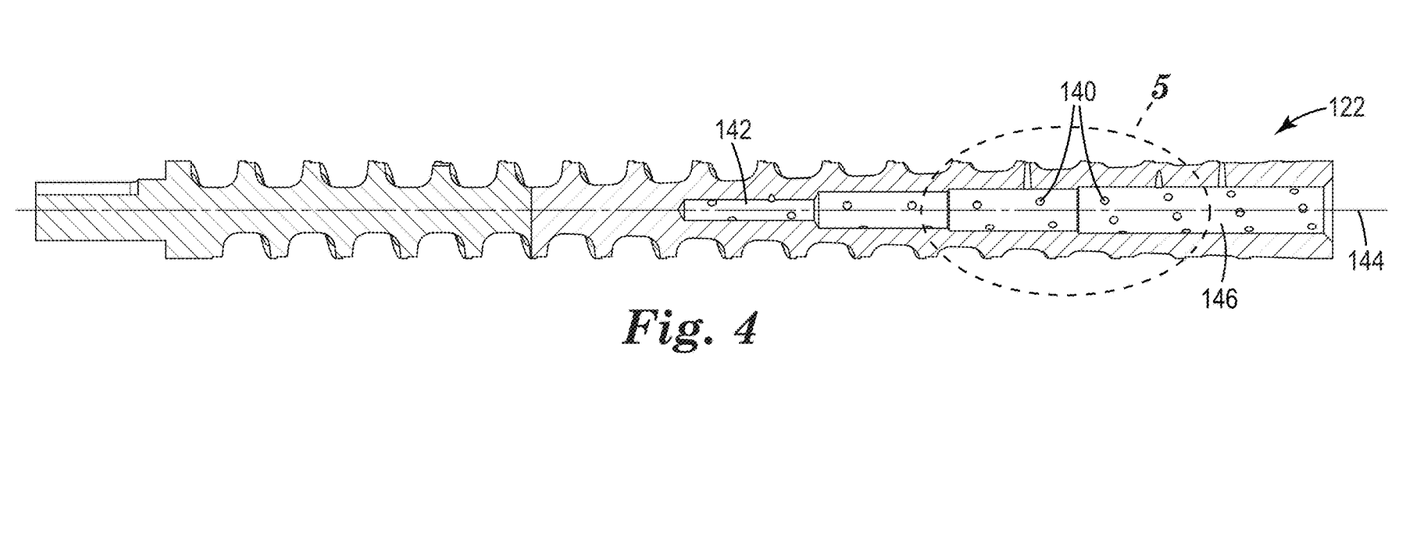
FIG. 4 is a cross-sectional side view of the screw of FIG. 3.

The cross-sectional view of FIG. 4 reveals the internal surfaces of the screw 122, which collectively define a cavity 142. The cavity 142 is open at the distal end 136 of the screw 122 and extends toward the shank end 134 along longitudinal axis 144. Here, the cavity 142 has an elongated shape that is generally symmetric about the longitudinal axis 144, although that need not be the case.

The cavity 142 terminates prior to reaching the shank end 134, such that the length of the cavity 142 along the longitudinal axis 144 is significantly less than the overall length of the screw 122. In some embodiments, the cavity 142 extends along 20 percent to 70 percent, 30 percent to 60 percent, 40 percent to 55 percent, or in some embodiments, less than, equal to, or greater than 20 percent, 22, 25, 27, 30, 32, 35, 37, 40, 42, 45, 47, 50, 52, 55, 57, 60, 62, 65, 67, or 70 percent of the overall length of the screw 122. These cavity dimensions advantageously provide efficient evacuation of feed stock composition into the cavity 142 as it melts, resulting in low operational torque and high throughput.

The apertures 140 are located along a perforated portion 146 of the cavity 142. Optionally and as shown, the perforated portion 146 has a transverse dimension that generally increases with distance from the shank end 134. The transverse dimension is not particularly limited and may be a cross-sectional area or diameter of the cavity 142 measured perpendicular to the axis 144.

Before the feed stock reaches the perforated portion 146, it is desirable for a minimum amount of the feed stock to be molten. This minimum amount can be, in some embodiments, at least 10 percent of the feed stock by weight.

As the apparatus 102 is operated, molten composition is conveyed forward by the flight 132 of the screw 122, injected into the cavity 142 throughout the perforated portion 146, and ultimately expelled through the outlet 129 of the barrel 120. Advantageously, the tapered shape of the cavity 142 can provide a consistent forward flow of molten composition as the within the cavity 142 as material continually permeates through the apertures 140.

As shown in FIG. 4, the increase in the transverse (i.e., radial) dimension can happen in a discontinuous fashion, where the cavity 142 is comprised of a series of contiguous cylindrical sections having progressively increasing diameter. Other configurations are also possible; for example, the cavity 142 may have a conical shape, in which its transverse dimension continually increases along its length. The transverse dimension of the cavity may or may not increase linearly. More broadly, the widening of the cavity 142 may not be monotonic and could include limited regions over which a transverse dimension decreases with distance from the shank end 134.

Along the exterior surface of the screw 122, the apertures 140 can be characterized by an associated hole area, which is a unitless quantity (e.g., %) representing the total cross-sectional area of the apertures per unit area along the exterior surface, and is a function of the number and sizes of the holes. As evident from FIGS. 2-4, the number of apertures 140 along the screw 122 generally increases when approaching the distal end 136 of the screw 122. Accordingly, the perforated portion 146 has a hole area, relative to the exterior surface of the screw 122, that increases with distance from the shank end 134 of the screw 122.

Optionally, the hole area can be distributed alone the length of the screw according to the melting rate of the feed stock composition. Having more (or larger) apertures 140 allows unmelted polymer that reaches the distal end 136 of the screw 122 to pass into the cavity 142 upon melting. As a further option, there could be a bimodal distribution of apertures 140 based on the above to facilitate a high melting rate.

Figure 5:
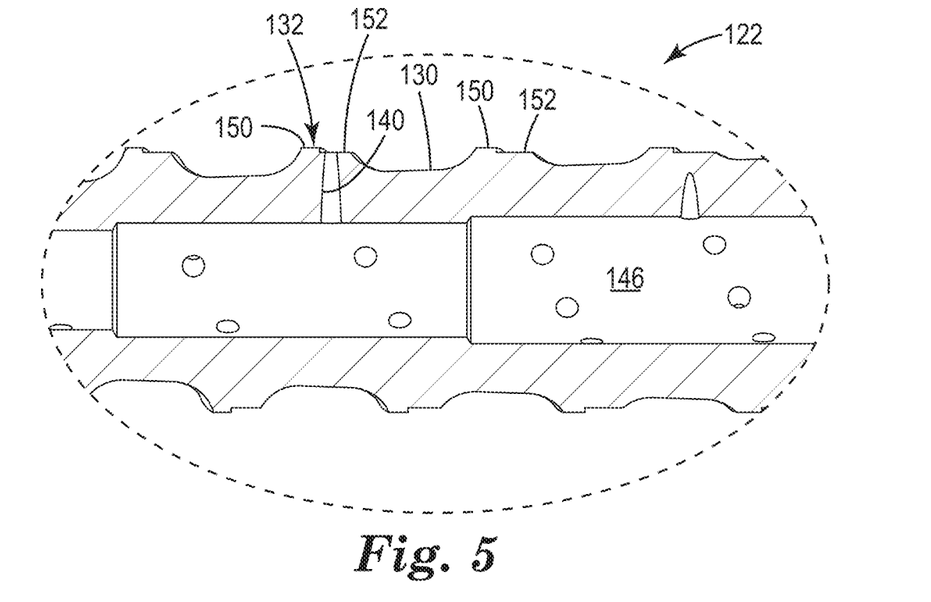
FIG. 5 is an enlarged cross-sectional side view of a portion of the screw shown in the inset 5 in FIG. 4.

FIG. 5 shows further cross-sectional details of the screw 122. This figure shows the position of the apertures 140 relative to the flight 132. As shown, the flight 132 is comprised of a raised flight section 150 and one or more lowered flight sections 152, each extending along the length of the flight 132. When disposed within the barrel 120, the raised flight section 150 faces toward the shank end 134 of the screw 122 while the lowered flight section 152 is distal to the raised flight section 150 and faces toward the distal end 136 of the screw 122.

The raised flight section 150 has a higher profile than the lowered flight section 152. The raised flight section 150 has a diameter close to the inner diameter of the barrel 120, forming a seal between the flight 132 and the inner surface of the barrel 120. The apertures 140 are at least partially located on the lowered flight section 152 proximate to this seal. During operation of the apparatus 102, a pressurized zone is created along the lowered flight section 152 immediately distal to the raised flight section 150 to urge molten composition through the aperture 140 and into the cavity 142.

It is advantageous for the apertures 140 to be located on the surfaces of the flight 132 facing the barrel 120 because feed stock composition within the narrow annular space around the flight 132 tends to melt immediately, thereby preventing solid particulates of feed stock from clogging the apertures 140. Large solid particulates can also be excluded from entering this annular space on account of their size. While all of the apertures 140 are disposed on the lowered flight section 152 in the present embodiment, it is possible for at least some apertures to communicate with the cavity 142 at other locations along the screw 122. Given the considerations above, it is preferable for any such apertures to be located where they are unlikely to be clogged.

Clogging can lead to a number of technical problems. For example, significant clogging of the apertures 140 can lead to recirculation flow with increased residence time, a loss of feeding rate, increase screw torque required, and pressure surging.

It is preferable for the degree of shear experienced by the molten composition to monotonically decrease with increasing distance from the raised flight section 150 in the distal direction, thereby facilitating flow of the molten composition into the apertures 140. For the screw 122 depicted in FIGS. 2-5, no subsequent portion of the flight 132 resides in the distal direction from a given aperture 140 and has a height greater than that of the lowered flight section 152. In a preferred embodiment, and as shown, the lowered flight section 152 is adjacent to an exposed surface of the shaft 130. In other embodiments, at least one additional lowered flight section is located distal to the lowered flight section 152 and adjacent to an exposed surface of the shaft 130.

At its distal end 136, the screw 122 terminates in a blister ring 154 that has a diameter close to that of the inner surface of the barrel 120. Assisted by a thin layer of molten composition thereon, the blister ring 154 can form a seal against the barrel 120, preventing egress of composition beyond the blister ring 154 from the annular recess 121 (shown in FIG. 2) between the exterior surfaces of the screw 122 and the barrel 120. Since substantially all communication between the annular recess 121 and the outlet 129 is through the plurality of apertures 140, any remaining molten composition within the annular recess 121 is eventually forced into the cavity 142 through the apertures 140.

Figure 6:
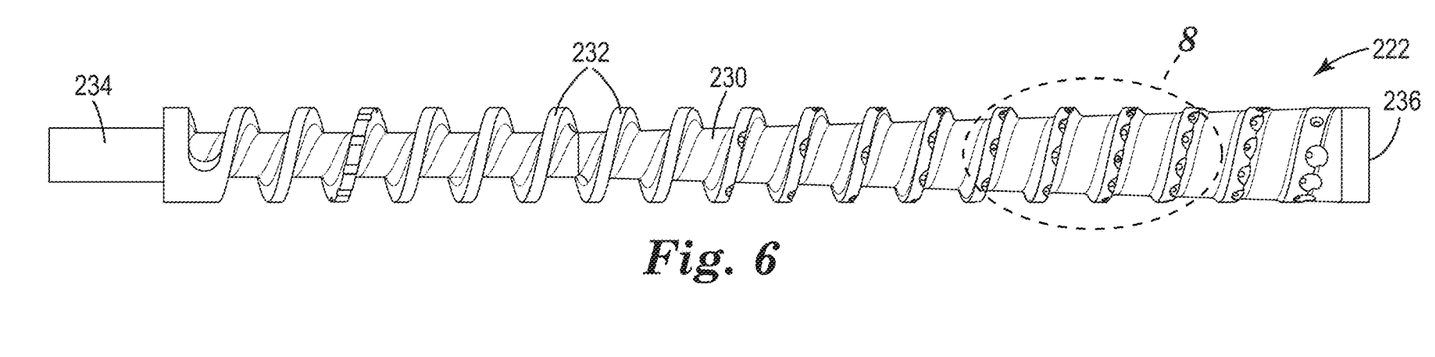
FIG. 6 is an elevational, side view of a screw according to an alternative embodiment usable in the dispensing apparatus of FIG. 2.
Figure 7:
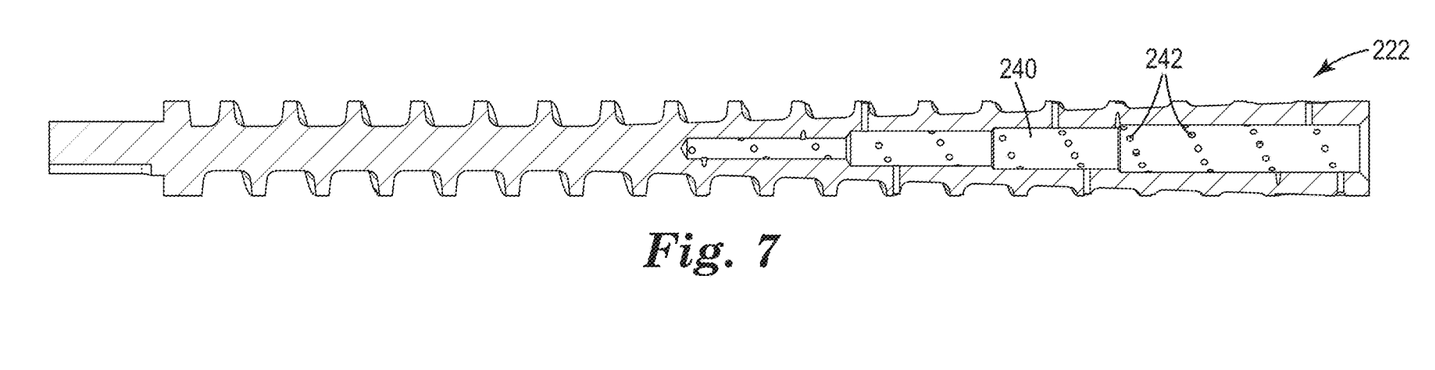
FIG. 7 is a cross-sectional side view of the screw of FIG. 6.
Figure 8:
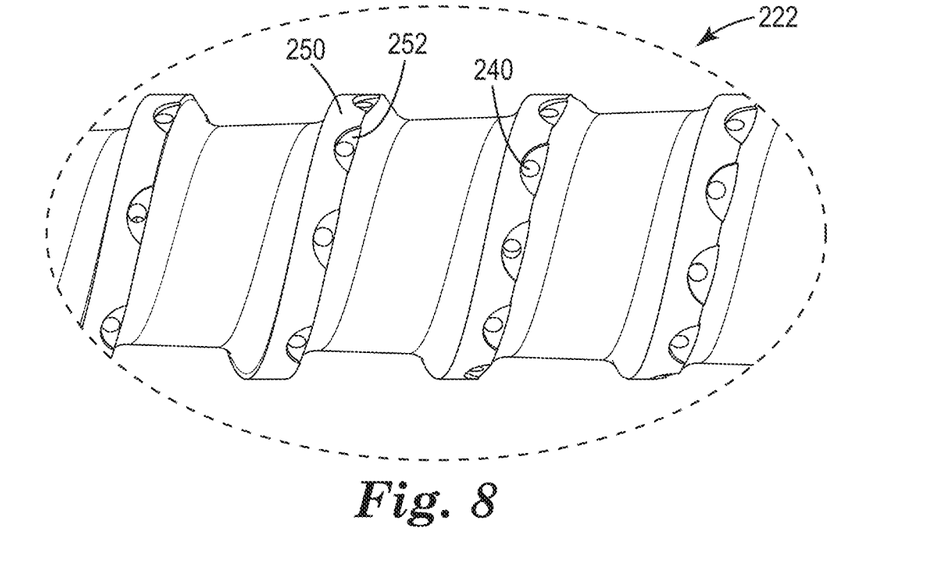
FIG. 8 is an enlarged cross-sectional side view of a portion of the screw shown in the inset 8 in FIG. 6.

FIGS. 6-8 show a screw 222 according to an alternative embodiment. The screw 222 has a configuration similar to that of the screw 122 in most respects. Like screw 122, the screw 222 has a similar shank end 234 and distal end 236, with a single helical flight 232 extending around a shaft 230, whose diameter generally increases from the shank end 234 to the distal end 236. As before, a plurality of apertures 240 extend radially from the external surface of the screw 222 to an internal cavity 242.

As visible in FIG. 6 and the enlarged view of FIG. 8, the flight 232 of the screw 222 has a raised flight section 250 extending continuously along the flight 232 and a plurality of lowered flight sections 252 discontinuously spread along the flight 232 and distal to the raised flight section 250. The lowered flight sections 252 have a semi-circular shape when viewed in the radial direction and extend into the raised flight section 250 to provide an opening next to the flight channel through which molten composition from the neighboring flight channel can enter the aperture 140.

Advantages of the screw 222 include simplified manufacturing of the screw flights and improved seal between the flight 232 and the inner surface of the surrounding barrel during operation. The raised flight section 250 also extends over a broader area, providing a reduced wear rate of the screw 222 during extended use and improved longevity.

Other features and associated advantages of the screw 222 are substantially analogous to those described in screw 122 and shall not be repeated.

Optionally, any of the aforementioned dispensing screws may include certain features or qualities not explicitly illustrated here. For example, the cavity within the screw may contain one or more structures that can assist in further improving the quality of mixing in the dispensing apparatus. Such structures could include a static mixer, which may or may not be configured to rotate along with the screw during a dispensing operation.

Methods of using the provided apparatus include operations that can take place concurrently during a continuous dispensing process. The first is the feeding of a feed stock composition into the inlet of the barrel. The second is rotating the hollow dispensing screw to convey the composition toward the distal end of the screw. The third is generating sufficient pressure through that screw rotation to urge the composition through the plurality of apertures and into the cavity within the screw. The fourth is expelling the composition from the cavity through the outlet of the barrel. These steps will be examined in more detail below.

The feed stock composition is not particularly limited. Besides the continuously fed filament adhesive illustrated in the exemplary embodiment of FIG. 1, the feed stock can include common thermoplastics such as polyethylene (PE), polypropylene, acetal, acrylic, nylon (polyamides), polystyrene, fluoropolymers, polyvinyl chloride (PVC), polyurethanes, thermoplastic elastomers, thermoplastic urethane, polyesters, acrylonitrile butadiene styrene (ABS), polycarbonate, and blends thereof. These materials are commonly provided in discrete form (pellets, granules, flakes, powders, etc.) and fed into the barrel through any known feed mechanism.

Rotation of the dispensing screw is driven by a drive mechanism and ideally operates at a speed commensurate with the desired throughput for the dispensing operation. While dependent on the diameter of the screw, the screw speed can be from 30 rpm to 400 rpm, from 50 rpm to 300 rpm, from 70 rpm to 120 rpm, or in some embodiments, less than, equal to, or greater than 30 rpm, 40, 50, 60, 70, 80, 90, 100, 110, 120, 150, 170, 200, 220, 250, 270, 300, 350, or 400 rpm.

As the feed stock is conveyed forward along the barrel, it is melted and pressurized by the inflow of feed stock composition behind it. Under this pressure, the molten material flows into the plurality of apertures and into the screw cavity. The cavity is smallest near the region of the screw where melting first occurs and becomes progressively larger to accommodate additional material as more of the solid feed stock composition becomes molten. A significant benefit of this configuration is that the molten composition can be evacuated from the flight channels soon after it is formed, thereby improving efficiency of heat transfer to residual unmelted composition. This in turn enhances the rate of melting and enables the flight channel depth to taper down more quickly along the length of the screw. The overall length of the screw can be thus reduced, saving weight.

The high efficiency of the provided screw configuration enables a higher throughput. This increased throughput allows for an increase in channel depth adjacent to the barrel inlet for a higher feed rate as well as a longer and more aggressive flight pitch that can move material through the barrel more quickly than in conventional dispensers. Moreover, the shorter screw reduces overall torque, enabling the upper limits of screw speed to be significantly increased relative to conventional dispensers.

Upon entering the cavity, the molten composition is conveyed forward in an ordered flow profile until being eventually expelled through the outlet at the distal end of the barrel. In preferred embodiments, the flow profile is approximately laminar, characterized by parallel cylindrical layers that flow with relatively little disruption between layers. The trumpeted shape of the cavity along its perforated portions is technically significant as it helps maintain a consistent flow of the composition and narrow the distribution of residence time within the dispensing apparatus. Moreover, by increasing volume of the cavity when moving away from the inlet of the barrel, pressures are reduced or maintained to allow for material flow towards the distal end. A long tail in the residence time distribution generally leads to poor mixing, and in some cases, thermal degradation of the composition.

The provided dispensing screw and dispensing apparatus provides significant advantages in applications where minimization of weight and size is important. In some embodiments, the dispensing apparatus has an overall weight that is at most 10 kg, at most 8 kg, or at most 6 kg. Working examples of the dispensing apparatus are light and compact enough to be mounted to light duty robotic arms currently used in manufacturing facilities.

While not intended to be exhaustive, particular exemplary embodiments are provided below:

1. An apparatus for dispensing a composition, the apparatus comprising: a barrel having an inlet and an outlet; a screw received in the barrel, the screw having a distal end and a shank end; and a drive mechanism operatively coupled to the shank end and capable of rotating the screw within the barrel, wherein the screw is hollow and includes both interior and exterior surfaces, the interior surfaces defining a cavity adjacent to the outlet, and wherein the screw further includes a plurality of apertures through which the cavity and exterior surfaces communicate with each other, the plurality of apertures located along a perforated portion of the cavity, and the perforated portion having a transverse dimension that increases with distance from the shank end.

2. The apparatus of embodiment 1, wherein the screw comprises a helical flight extending around a shaft, the helical flight including a raised flight section and one or more lowered flight sections adjacent to the raised flight section, each lowered flight section located distal to the raised flight section and adjacent to an exposed surface of the shaft, and further wherein the plurality of apertures are at least partially located on the one or more lowered flight sections.

3. The apparatus of embodiment 1 or 2, wherein the perforated portion has a hole area, relative to the exterior surface of the screw, that increases with distance from the shank end.

4. An apparatus for dispensing a composition, the apparatus comprising: a barrel having an inlet and an outlet; a screw received in the barrel, the screw having a distal end and a shank end; and a drive mechanism operatively coupled to the shank end and capable of rotating the screw within the barrel, wherein the screw is hollow and includes both interior and exterior surfaces, the interior surfaces defining a cavity adjacent to the outlet, and wherein the screw further includes a plurality of apertures through which the cavity and exterior surfaces communicate with each other, and wherein the screw comprises a helical flight extending around a shaft, the helical flight including a raised flight section and one or more lowered flight sections adjacent to the raised flight section, and each lowered flight section located distal to the raised flight section and adjacent to an exposed surface of the shaft, and wherein the plurality of apertures are at least partially located on the one or more lowered flight sections.

5. The apparatus of embodiment 4, wherein the plurality of apertures are located along a perforated portion of the cavity, the perforated portion having a transverse dimension that increases with distance from the shank end.

6. The apparatus of embodiment 4 or 5, wherein the plurality of apertures are located along a perforated portion of the cavity, and wherein the perforated portion has a hole area, relative to the exterior surface of the screw, that increases with distance from the shank end.

7. An apparatus for dispensing a composition, the apparatus comprising: a barrel having an inlet and an outlet; a screw received in the barrel, the screw having a distal end and a shank end; and a drive mechanism operatively coupled to the shank end and capable of rotating the screw within the barrel, wherein the screw is hollow and includes both interior and exterior surfaces, the interior surfaces defining a cavity adjacent to the outlet, and wherein the screw further includes a plurality of apertures through which the cavity and exterior surfaces communicate with each other, and wherein the plurality of apertures are located along a perforated portion of the cavity, the perforated portion having a hole area, relative to the exterior surface of the screw, that increases with distance from the shank end.

8. The apparatus of embodiment 7, wherein the perforated portion has a transverse dimension that increases with distance from the shank end.

9. The apparatus of embodiment 7 or 8, wherein the screw comprises a helical flight extending around a shaft, and wherein the plurality of apertures are located on the helical flight.

10. The apparatus of embodiment 9, wherein the helical flight includes a raised flight section and one or more lowered flight sections adjacent to the raised flight section, and each lowered flight section located distal to the raised flight section and adjacent to an exposed surface of the shaft, and further wherein the plurality of apertures are at least partially located on the one or more lowered flight sections.

11. The apparatus of any one of embodiments 1-10, wherein the exterior surfaces of the screw and the barrel collectively define an annular recess, and wherein substantially all communication between the annular recess and the outlet is through the plurality of apertures.

12. A screw having a distal end and a shank end for use with an apparatus for dispensing a composition, the apparatus comprising a barrel having an inlet and an outlet and a drive mechanism operatively coupled to the shank end and capable of rotating the screw within the barrel, the screw comprising: a shaft; a helical flight extending around the shaft, wherein the shaft is hollow and includes both interior and exterior surfaces, the interior surfaces defining a cavity adjacent to the outlet; and a plurality of apertures through which the cavity and exterior surfaces communicate with each other, the plurality of apertures located along a perforated portion of the cavity, the perforated portion having a transverse dimension that increases with distance from the shank end.

13. A screw having a distal end and a shank end for use with an apparatus for dispensing a composition, the apparatus comprising a barrel having an inlet and an outlet and a drive mechanism operatively coupled to the shank end and capable of rotating the screw within the barrel, the screw comprising: a shaft; a helical flight extending around the shaft, wherein the shaft is hollow and includes both interior and exterior surfaces, the interior surfaces defining a cavity adjacent to the outlet; and a plurality of apertures through which the cavity and exterior surfaces communicate with each other, wherein the helical flight includes a raised flight section and one or more lowered flight sections adjacent to the raised flight section, and each lowered flight section located distal to the raised flight section and adjacent to an exposed surface of the shaft, and further wherein the plurality of apertures are at least partially located on the one or more lowered flight sections.

14. A screw having a distal end and a shank end for use with an apparatus for dispensing a composition, the apparatus comprising a barrel having an inlet and an outlet and a drive mechanism operatively coupled to the shank end and capable of rotating the screw within the barrel, the screw comprising: a shaft; a helical flight extending around the shaft, wherein the shaft is hollow and includes both interior and exterior surfaces, the interior surfaces defining a cavity adjacent to the outlet, and a plurality of apertures through which the cavity and exterior surfaces communicate with each other, wherein the plurality of apertures are located along a perforated portion of the cavity, the perforated portion having a hole area, relative to the exterior surface of the screw, that increases with distance from the shank end.

15. A method of dispensing a composition using the apparatus of any one of embodiments 1-11, the method comprising: feeding the composition into the inlet of the barrel; rotating the screw to convey the composition toward the distal end of the screw, and generating sufficient pressure to urge the composition through the plurality of apertures and into the cavity; and expelling the composition from the cavity through the outlet of the barrel.

EXAMPLES

TABLE 1

Materials

| Designation | Description | Source |
| --- | --- | --- |
| D1161 | A styrene-isoprene-styrene triblock copolymer having an approximate styrene content of 15% and 19% diblock content, available under the trade designation KRATOND1161 P | Kraton Performance Polymers, Houston, TX, United States |
| P140 | A fully hydrogenated hydrocarbon resin with a softening point of 140° C., available under the trade designation ARKON P-140 | Arakawa, Osaka, Japan |
| LBR361 | A butadiene homopolymer with glass transition temperature of -49 degrees Celsius, available under the trade designation KURARAY LBR-361 | Kuraray America, Incorporated, Houston, TX, United States |
| IRG1010 | Pentaerythritoltetrakis(3-(3,5-ditertbutyl-4-hydroxyphenyl)propionate), an antioxidant available under the trade designation IRGANOX 1010 | BASF Corporation, Florham Park, NJ, United States |
| EVA-CB | A pelletized ethyl vinyl acetate containing carbon black at a concentration of 40 wt%, available under the trade designation REMAFIN Black EVA 40% | Clariant Corporation, Holden, MA, United States |
| NA217000 | A low-density polyethylene resin available under the trade designation Petrothene NA217000 | Lyondell Basell, Houston, TX, United States |

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

Test Methods:

Material Changeover Test: A first clear-colored filament was fed into a dispense head for at least three minutes to achieve a steady state. Dispensing was done at 215° C. The dispenser was stopped, and the first filament was severed. A second black-colored filament was spliced into the dispense head. Connection between the segments relied on the inherent tackiness of the filament ends. The dispenser was run for five seconds in order to get the second filament into the inlet orifice of the barrel. Subsequently, adhesive was dispensed onto a steel panel that was painted white for five seconds. Continual measurements alternated between discarding five seconds worth of dispensed adhesive and dispensing adhesive for five seconds onto white painted steel panels. The residence time of the second filament was monitored within the barrel. The absence or presence of the second filament exiting the nozzle was quantified using a X-Rite Color i5 brand colorimeter. The color was measured using a L*a*b* spectrum. Values of delta E* less than or equal to 3.0 were considered to not include any of the second filament, and therefore signaling the start or end of a changeover between the block copolymers.

Melt Quality Test: Adhesive samples were dispensed onto tempered glass substrates (50 mm×150 mm×6 mm) at 116 degrees Celsius. The screw was operated at 200 revolutions per minute, and the feed wheel was operated at 13 revolutions per minute. After reaching a constant temperature at 116 degrees Celsius, an adhesive sample was dispensed for at least three minutes to reach a steady state. Specimens were collected by manually moving the glass substrate under the nozzle with a gap of 6 mm to 10 mm at a rate of 25 mm/s. The nozzle was set sufficiently far away from the substrate in order that it did not smear the bead, which would impact the resulting surface roughness of the adhesive. Samples were cooled for at least 30 minutes to equilibrate at room temperature. A Keyence VK-X100 Laser microscope was used to quantify surface roughness. Measurements were made at three different locations on each sample across the diagonals of a 1.7 mm×1.4 mm rectangle. All measurements for a given sample were averaged. The arithmetical mean deviation of the assessed profile, Ra value, of less than 20 micrometers was considered to pass the melt quality test.

Throughput Measurement Test: Adhesive samples were dispensed into pre-weighed aluminum pans at 215° C. The screw and feed wheel revolutions per minute (RPM) were set to prescribed values. Dispensing was conducted for one minute and the mass of dispensed material was used to calculate the throughput in kilograms/hour (kg/h). For each setpoint condition, three measurements were made, and the results were averaged. Between samples, the dispenser was kept miming in order to maintain steady state.

Preparatory Examples 1 and 2 (PE1-PE2)

Preparation of Polymodal Asymmetric Block Copolymer

A polymodal, asymmetric star block copolymers ("PASBC") was prepared according to Example 1 of U.S. Pat. No. 5,393,787 (Nestegard et al.), the subject matter of which is hereby incorporated by reference in its entirety. The polymer had a number average molecular weight of about 4,000 Daltons and about 21,500 Daltons for the two end blocks, 127,000-147,000 Daltons for the arm, and about 1,100,000 Daltons for the star measured by SEC (size exclusion chromatography) calibrated using polystyrene standards. The polystyrene content was between 9.5 and 11.5 percent by weight. The mole percentage of high molecular weight arms was estimated to be about 30%.

Preparation of the Core-Sheath Filaments

Compositions for the first and second filaments are represented in Table 2. Further description of techniques and processes to assemble filament constructions are contained in PCT Patent Publication No. 2019/1646798 (Nyaribo et al). The core adhesive raw materials were compounded in a 30 mm Steer twin screw dispenser operating at 212° C. A Zenith gear pump was used to push molten adhesive through a heated hose with 25 mm inner diameter and length of 2.4 meters. The molten adhesive was dispensed through the center orifice of a coaxial die into a 30° C. water bath and manually wound into fiber drums. Core-sheath filaments were made with 8 mm+/−1 mm diameter. The sheath material was fed in using a 30 mm single screw dispenser set to 204° C. and dispensed through the outer ring orifice of the coaxial die.

TABLE 2

Compositions of Filaments

| Filament | D1161 (pbw) | PASBC (pbw) | P140 (pbw) Core | LBR361 (pbw) | IRG1010 (pbw) | EVA-CB (pbw) | NA217000 (pbw) Sheath | Filament Diameter (mm) |
|---|---|---|---|---|---|---|---|---|
| PE1 | 41.2 | 13.4 | 34.6 | 5.8 | 1 | 0 | 4 | 8 |
| PE2 | 41.1 | 13.4 | 34.6 | 5.8 | 1 | 0.1 | 4 | 8 |

Examples 1-3 and Comparative Examples 1-3 (EX1-EX3 and CE1-CE3)

Dispensing of the Adhesive

Core-sheath filaments as assembled in PE2 were fed directly out of a fiber drum into a dispensing head. The dispensing head contained either a hollow core screw (EX1-EX3) or a non-hollow core screw (CE1-CE3) both of which were fabricated as further defined below. The dispense head was set to either 215° C. (for throughput measurement), or 116° C. (for material changeover testing). RPM of the screw and feed wheel were set to desired rates as represented in Table 3. Specimens were collected as they exited the nozzle. A nozzle was used with 5 mm circular orifice and a length of 25 mm. Throughput measurements test results are recorded in Table 3.

TABLE 3

Throughput Measurements Test Results (at 215° C.)

|  | EX1 | CE1 | EX2 | CE2 | EX3 | CE3 |
|---|---|---|---|---|---|---|
| Screw, RPM | 28 | 28 | 40 | 40 | 52 | 52 |
| Feed Wheel, RPM | 7 | 7 | 10 | 10 | 13 | 13 |
| Throughput, kg/h | 1.5 | 1.3 | 2.2 | 2.0 | 2.7 | 2.6 |

Example 4 (EX4) and Comparative Example 4 (CE4)

Material Changeover Testing

Core-sheath filaments as assembled in PE1 and PE2 underwent Material Changeover testing. The dispensing head contained either a hollow core screw (EX4) or a non-hollow core screw (CE4). Material changeover test results are recorded in Table 4. N/A indicates not applicable.

TABLE 4

Material Changeover Test Results

| | Color measurement, delta E* (10 second intervals) | | | | | | | Changeover duration, s |
|---|---|---|---|---|---|---|---|---|
| EX4 | 2.2 | 30.7 | 28.2 | 10.3 | 8.0 | 6.2 | 1.8 | N/A | 50 |
| CE4 | 3 | 4.4 | 33.1 | 32.9 | 13.6 | 9.0 | 4.8 | 0.3 | 60 |

Example 5 (EX5) and Comparative Example 5 (CE5)

Melt Quality Testing

Core-sheath filaments as assembled in PE2 underwent Melt Quality testing. The dispensing head contained either a hollow core screw (EX5) or a non-hollow core screw (CE5). Melt quality test results are recorded in Table 5.

TABLE 5

Melt Quality Test Results

| | Roughness Measurement, Ra (micrometers) ± σ (micrometers) |
|---|---|
| EX5 | 9.9 ± 4.1 |
| CE5 | 45.6 ± 20.4 |

Hollow Core Screw Fabrication:

A 22.9 cm (9.0 inch) screw with a diameter of 1.91 cm (0.75 inches) as represented in FIG. 3 and FIG. 4 was machined in a computer numerical controlled (CNC) four-axis vertical endmill. The machining process was performed on a solid cylinder of aluminum using two operations. In the first step, the exterior geometry was milled out, including the through holes (140). In the second step, the screw was mounted onto a lathe to drill out the center cavity using three different diameter drills into the appropriate depth. The pitch (i.e., height-to-height distance between flights) is 12.5 mm, resulting in 17 revolutions of the flight on the screw. The screw root diameter (diameter minus the height of flights) is 8.9 mm. The through hole diameter is 1.6 mm. The hollow core consisted of 4 step in a cavity of increasing depth, starting with step 1 (9.1 mm diameter, 50 mm deep), step 2 (8.23 mm diameter, 75.4 mm deep), step 3 (7.1 mm diameter, 102 mm deep), and step 4 (4.1 mm diameter, 128 mm deep). Each step in the hollow core had a corresponding frequency of through holes spaced a given degrees of revolution around the screw (step 1=50 degrees, step 2=70 degrees, step 3=90 degrees, and step 4=110 degrees). The deepest section of the hollow core has through holes spaced apart the furthest. The frequency of through holes increases and the flight depth decreases toward the dispensing end (opposite end from motor mount) because the amount of un-melted adhesive increases in that direction.

Non-Hollow Screw Fabrication:

A non-hollow core screw was fabricated for comparison. The design was selected to also minimize torque and increase throughput. This was accomplished through relatively deep flight. A 22.9 cm (9.0 inch) screw with a diameter of 1.91 cm (0.75 inches) was machined in a computer numerical controlled (CNC) three-axis vertical endmill. The machining process was performed on a solid block of aluminum using two operations. In the first step, the top half of the screw, as viewed down the screw axis, was machined. The partially milled block was flipped over, and the other half of the screw was then machined. The design was selected to also minimize torque and increase throughput. This was accomplished through relatively deep flight. Starting at the motor coupling end, the first 126 mm (4.95 inches) were identical to the hollow screw design. Starting at 126 mm going to 177 mm, the screw root diameter (diameter minus the height of flights) increased from 8.9 mm to 13 mm. Also, notches in the flight were included between 170 mm and 197.1 mm. This design left the height of the flights relatively deep, 6.1 mm, at the exit end of the screw. This allowed for reduced torque and higher throughput, the risk of unmelted resin passing through the dispenser increases.

Dispense System Component Fabrication:

Other dispense system components were assembled according to fabrication techniques described in U.S. Provisional Patent Application No. 62/810,248 (Napierala et al).

All cited references, patents, and patent applications in the above application for letters patent are herein incorporated by reference in their entirety in a consistent manner. In the event of inconsistencies or contradictions between portions of the incorporated references and this application, the information in the preceding description shall control.

The preceding description, given in order to enable one of ordinary skill in the art to practice the claimed disclosure, is not to be construed as limiting the scope of the disclosure, which is defined by the claims and all equivalents thereto.

What is claimed is:

1. An apparatus for dispensing a composition, the apparatus comprising:
    a barrel having an inlet and an outlet;
    a screw received in the barrel, the screw having a distal end and a shank end spaced along a longitudinal axis, and a shaft having a single helical flight disposed thereon, the shaft becoming progressively larger in diameter from the shank end to the distal end; and
    a drive mechanism operatively coupled to the shank end and capable of rotating the screw within the barrel,
    wherein the screw is hollow and includes one or more interior surfaces and one or more exterior surfaces, the one or more interior surfaces defining a cavity adjacent to the outlet, and wherein the screw further includes a plurality of apertures through which the cavity and the one or more exterior surfaces of the screw communicate with each other, the plurality of apertures located along a perforated portion of the cavity, and the perforated portion having a transverse dimension that increases with distance from the shank end, wherein the plurality of apertures are located on the helical flight,
    wherein the perforated portion defines a hole area, representing a total cross-sectional area of the apertures per unit area of the one or more exterior surfaces, that increases with the diameter of the shaft along the longitudinal axis and the distance from the shank end.

2. The apparatus of claim 1, wherein the screw comprises the helical flight extending around the shaft, the helical flight including a raised flight section and one or more lowered flight sections adjacent to the raised flight section, each of the one or more lowered flight sections located distal to the raised flight section and adjacent to an exposed surface of the shaft, and further wherein the plurality of apertures are at least partially located on the one or more lowered flight sections.

3. The apparatus of claim 2, wherein the one or more lowered flight sections are discontinuously spread along the helical flight.

4. The apparatus of claim 2,
    wherein a portion of the helical flight in a distal direction of each of the plurality of apertures does not have a height greater than that of the respective lowered flight section in the portion.

5. A method of dispensing a composition using the apparatus of claim 1, the method comprising:
    feeding the composition into the inlet of the barrel;
    rotating the screw to convey the composition toward the distal end of the screw, and generating sufficient pressure to urge the composition through the plurality of apertures and into the cavity; and
    expelling the composition from the cavity through the outlet of the barrel.

6. An apparatus for dispensing a composition, the apparatus comprising:
    a barrel having an inlet and an outlet;
    a screw received in the barrel, the screw having a distal end and a shank end spaced along a longitudinal axis, and a shaft having a single helical flight disposed thereon, the shaft becoming progressively larger in diameter from the shank end to the distal end; and
    a drive mechanism operatively coupled to the shank end and capable of rotating the screw within the barrel,
    wherein the screw is hollow and includes one or more interior surfaces and one or more exterior surfaces, the one or more interior surfaces defining a cavity adjacent to the outlet, and wherein the screw further includes a plurality of apertures through which the cavity and the one or more exterior surfaces of the screw communicate with each other, and
    wherein the the single helical flight extend around the shaft, the helical flight including a raised flight section and one or more lowered flight sections adjacent to the raised flight section, and each of the one or more lowered flight sections located distal to the raised flight section and adjacent to an exposed surface of the shaft, and
    wherein the plurality of apertures are at least partially located on the one or more lowered flight sections, wherein the plurality of apertures are located on the helical flight,
    wherein the perforated portion defines a hole area, representing a total cross-sectional area of the apertures per unit area of the one or more exterior surfaces, that increases with the diameter of the shaft along the longitudinal axis and distance from the shank end.

7. The apparatus of claim 6, wherein the plurality of apertures are located along a perforated portion of the cavity, the perforated portion having a transverse dimension that increases with the distance from the shank end.

8. The apparatus of claim 6, wherein the one or more lowered flight sections are discontinuously spread along the helical flight.

9. The apparatus of claim 6,
    wherein a portion of the helical flight in a distal direction of each of the plurality of apertures does not have a height greater than that of the respective lowered flight section in the portion.

10. A method of dispensing a composition using the apparatus of claim 6, the method comprising:
    feeding the composition into the inlet of the barrel;
    rotating the screw to convey the composition toward the distal end of the screw, and generating sufficient pressure to urge the composition through the plurality of apertures and into the cavity; and
    expelling the composition from the cavity through the outlet of the barrel.

11. An apparatus for dispensing a composition, the apparatus comprising:
    a barrel having an inlet and an outlet;
    a screw received in the barrel, the screw having a distal end and a shank end spaced along a longitudinal axis, the screw comprising a shaft having a single helical flight extending around the shaft, the shaft becoming progressively larger in diameter from the shank end to the distal end; and a drive mechanism operatively coupled to the shank end and capable of rotating the screw within the barrel,
wherein the screw is hollow and includes one or more interior surfaces and one or more exterior surfaces, the one or more interior surfaces defining a cavity adjacent to the outlet, and wherein the screw further includes a plurality of apertures through which the cavity and the one or more exterior surfaces communicate with each other, and wherein the plurality of apertures are located along a perforated portion on the helical flight, wherein the perforated portion defines a hole area, representing a total cross-sectional area of the apertures per unit area of the one or more exterior surfaces, that increases with the diameter of the shaft along the longitudinal axis and the distance from the shank end.

12. The apparatus of claim 11, wherein the perforated portion has a transverse dimension that increases with the distance from the shank end.

13. The apparatus of claim 11, wherein the helical flight includes a raised flight section and one or more lowered flight sections adjacent to the raised flight section, and each of the one or more lowered flight sections located distal to the raised flight section and adjacent to an exposed surface of the shaft, and further wherein the plurality of apertures are at least partially located on the one or more lowered flight sections.

14. The apparatus of claim 13, the one or more lowered flight sections are discontinuously spread along the helical flight.

15. The apparatus of claim 13,
wherein a portion of the helical flight in a distal direction of each of the plurality of apertures does not have a height greater than that of the respective lowered flight section in the portion.

16. A method of dispensing a composition using the apparatus of claim 11, the method comprising:
feeding the composition into the inlet of the barrel;
rotating the screw to convey the composition toward the distal end of the screw, and generating sufficient pressure to urge the composition through the plurality of apertures and into the cavity; and
expelling the composition from the cavity through the outlet of the barrel.

\* \* \* \* \*